Sept. 9, 1958 A. T. E. BINSTED ET AL 2,851,003
BUTTER SPREADING MACHINES

Filed Nov. 21, 1955 3 Sheets-Sheet 1

Inventors
A.T.E. BINSTED &
R. W. HOMEWOOD
By Young, Emery
& Thompson
Attorneys

Sept. 9, 1958 A. T. E. BINSTED ET AL 2,851,003
BUTTER SPREADING MACHINES
Filed Nov. 21, 1955 3 Sheets-Sheet 3

Inventors
A.T.E. BINSTED &
R.W. HOMEWOOD
By
Attorneys

United States Patent Office 2,851,003
Patented Sept. 9, 1958

2,851,003

BUTTER SPREADING MACHINES

Arthur T. E. Binsted, London, and Robert William Homewood, Ensbury Park, Bournemouth, England, assignors, by direct and mesne assignments, to B. A. M. Patentees Limited, Sunderland, England, a British company Application November 21, 1955, Serial No. 592,226

(Filed under Rule 47(a) and 35 U. S. C. 116)

10 Claims. (Cl. 118—13)

This invention relates to spreading machines for the spreading of any required viscous substance upon any required more or less solid base and especially for the spreading of butter and margarine upon slices of bread. The term "butter" used hereinafter is intended to include other similar substances and the term "bread" is intended to include other similar bases.

Hitherto it has been customary in canteens, restaurants and similar catering establishments to spread butter on slices of bread either manually or by means of a brush type of machine. Both methods suffer from the disadvantage that it is impossible to ensure a regular coating on the bread and consequently to ensure a knowledge of the number of slices which can be spread from a given weight of butter. This disadvantage is increased when using a brush type of machine. Moreover these machines are difficult to clean and expensive to produce. An object of the present invention is to ensure an accurate pre-determination of the amount of butter which will be spread on each slice of bread and evenness of spread over the whole surface so that an accurate knowledge is obtainable beforehand of the butter requirements for a given number of slices.

Further objects of the invention are to provide a spreading machine which is simple in construction, speedy in operation, comparatively inexpensive to produce and capable of being taken apart for cleaning and re-assembled by unskilled operators.

According to the present invention a spreading machine comprises a foraminous carrier, means for filling the perforations in the carrier with said substance, and means for ejecting the substance on to the surface of the base. The carrier may be movable over the surface of a mass of butter to fill the perforations in the carrier and then movable over the surface of the bread. The carrier is preferably cylindrical and rotatable one part of which being located adjacent the container for the butter and another part of which is located adjacent a conveyor for the base. The cylinder preferably contains a toothed roller of smaller diameter than the cylinder and meshing with a common generatrix of the cylinder and roller whereby the teeth force the butter out of the perforations on to the surface of the bread. The above and other features of the invention are indicated in the appended claims and will be understood from the following description given by way of example only of a spreading machine made in accordance with the invention.

Figure 1:
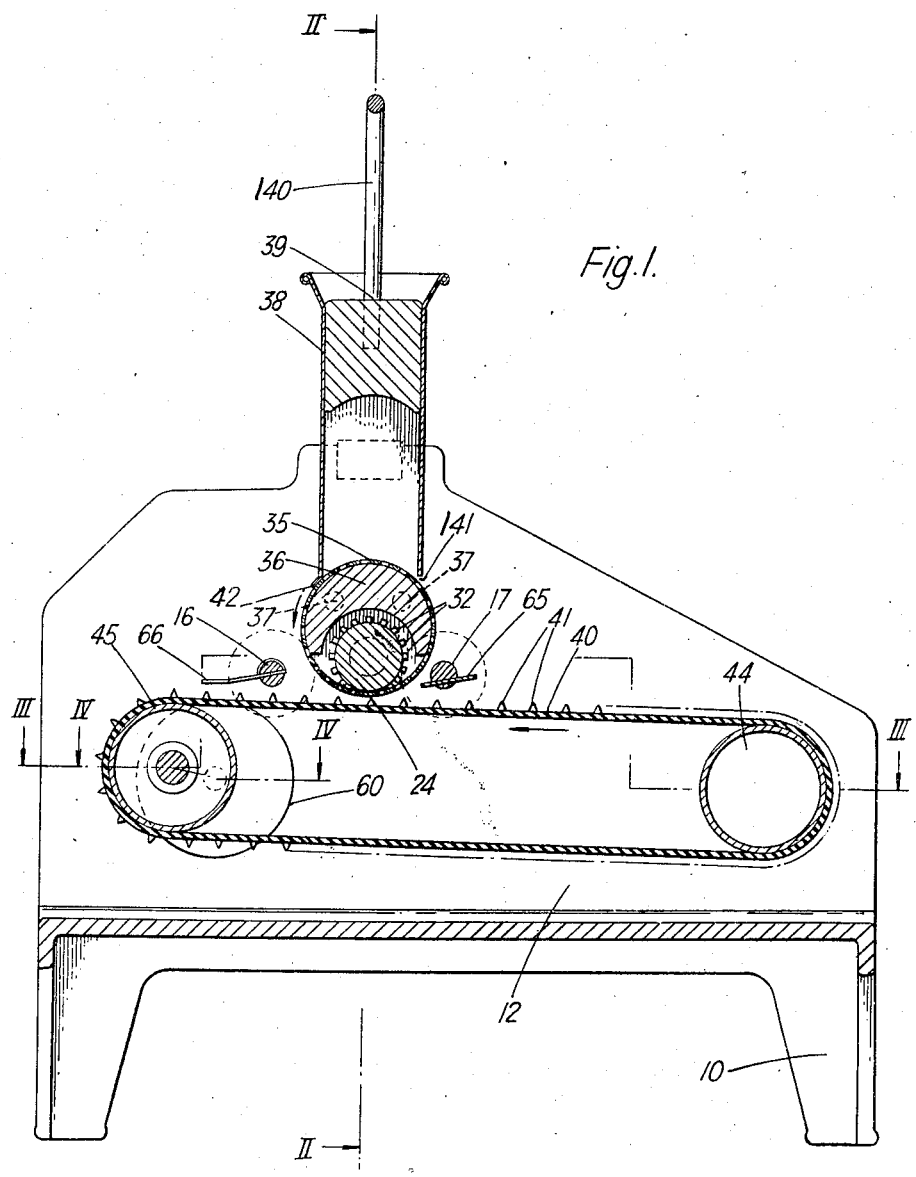
Figure 1 is a vertical sectional view of a spreading machine made in accordance with the invention the section being on the line 1—1 on Figure 2.
Figure 2:
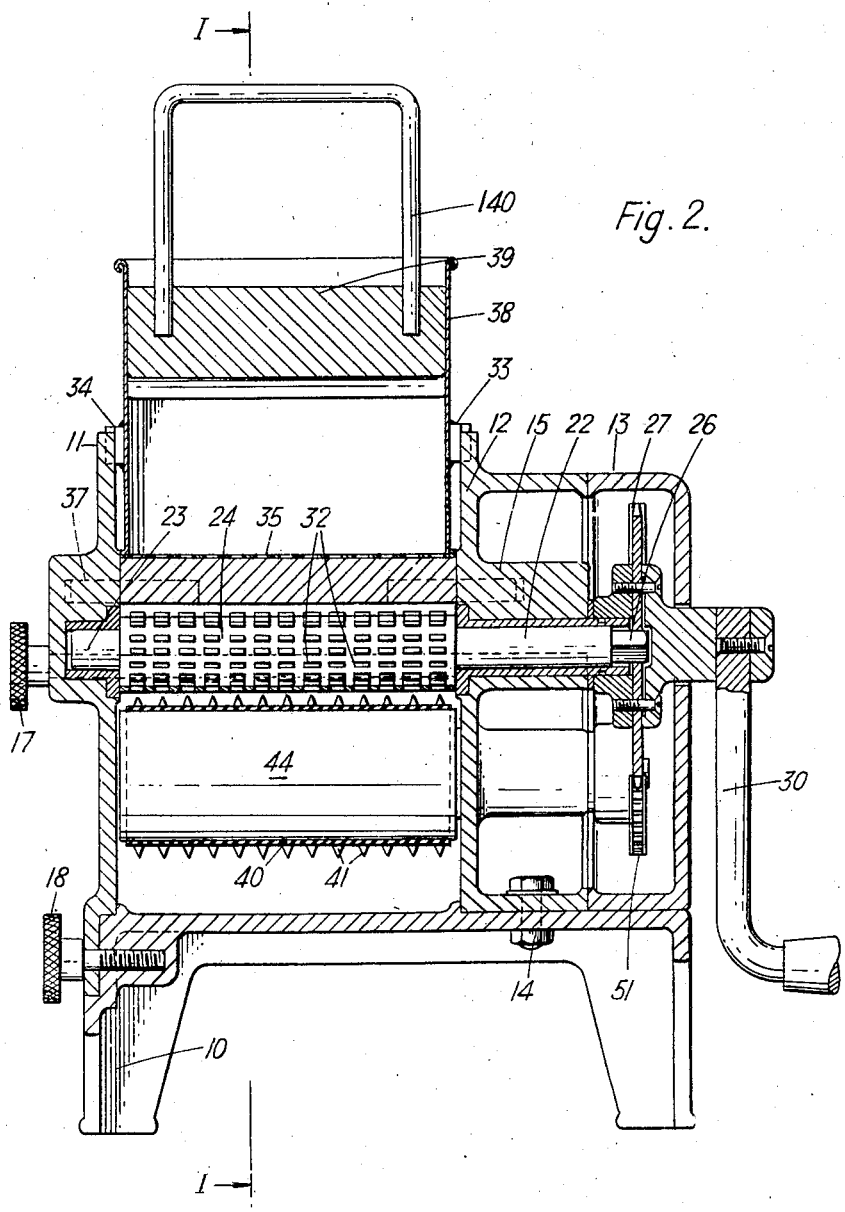
Figure 2 is a sectional view of the machine on the line 2—2 on Figure 1.
Figure 3:
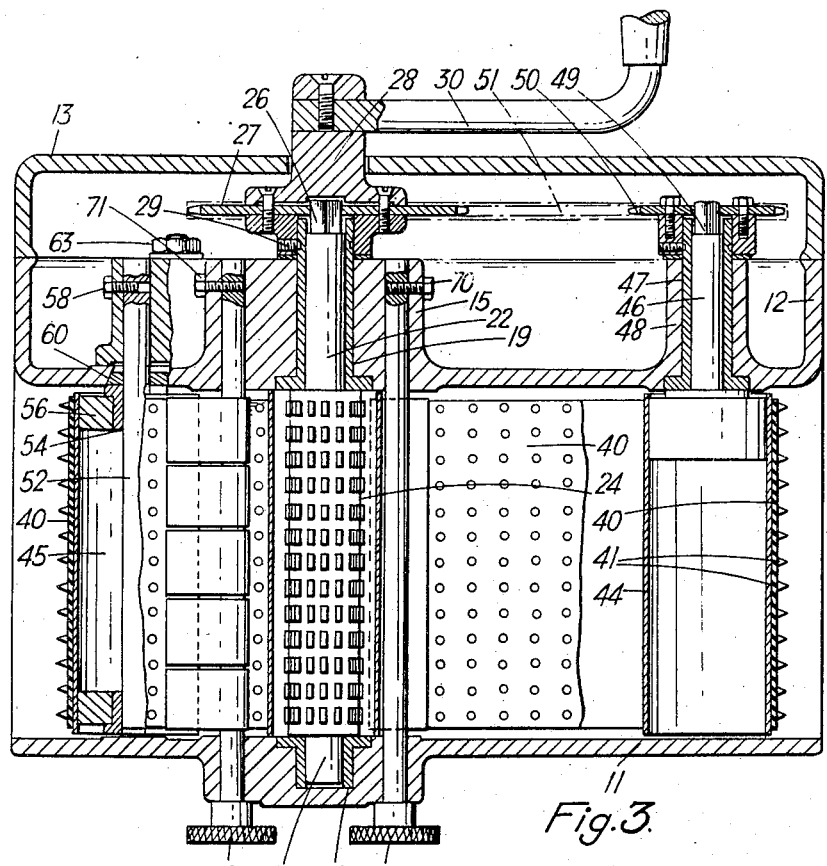
Figure 3 is a section of the line 3—3 on Figure 1.

The machine comprises a base 10 supporting a side plate 11 on one side and a pair of side plates 12, 13 on the other side. The plate 12 is attached to the base by a bolt 14, the plate 13 is attached to the plate 12 by other bolts not shown. The plate 11 is removably fixed in position by a pair of long bolts 16, 17 which are threaded into a boss 15 in the plate 12 and/or held by screws 70, 71) and by a bolt 18 threaded into the base 10. The boss 15 has a horizontal pin containing a bronze bush 19 and the plate 11 has a boss which is drilled to receive a bronze bush 21 in alignment with the bush 19. These bushes carry spigots 22, 23 on the opposite ends of the roller 24. The spigot 22 has a squared end 26 which enters disengageably into a square central hole in a chain sprocket 27 carired by a hub 28 that is fixed to the bush 19 by grub screws 29. The hub 28 carries a handle 30 whereby the sprocket, bush and roller can be rotated by the operator.

The roller 24 is milled on its peripheral surface to provide radial projections 32 in the form of slightly tapering teeth which may be arranged in lines along spaced generatrices of the roller and may conveniently be about a ¼ of an inch long axially and ⅛ of an inch wide. These teeth are made so as accurately to mesh with the perforations of a foraminous cylinder 35 which has a diameter about twice that of the roller. The cylinder 35 is conveniently made of 18 S. W. G. metal sheet and is supported on an arcuate bearing block 36 over approximately three quarters of its inner periphery, this bearing block being mounted by means of pins 37 on the side plates 11, 12. The cylinder is held down on to this bearing block by the roller 24. The bearing block 36 is ground at both ends so as to act as a spacer between the side frames of the machine. The cylinder is open ended and has a small clearance at its ends with the plates 11, 12.

Above the cylinder 35 is a box-shaped container or hopper 38 for the butter. The lower part of the hopper 38 enters between the upper ends of the plates 11, 12, and projections 33, 34 carried by the hopper 38 sit on the upper ends of the plates 11, 12, this hopper being open at its upper end to receive a weight 39 which presses the butter on to the cylinder 35 so as to fill the holes in the cylinder as the latter rotates. The weight 39 is provided with a handle 140. The uppermost part of the cylinder projects in the lower end of the hopper 38 so that the cylinder constitutes the closure of the open end of the hopper except for a small clearance 141 at the rearward side to allow re-entry of unused butter adhering to the cylinder into the hopper. At the exit side 42 the container closely engages the cylinder to prevent the cylinder from carrying excess butter. The butter is filled into the perforations of the cylinder 35 the depth of this filling being limited by the surface of the block 36. The teeth 32 progressively enter the perforations of the cylinder 35 so as to effect rotation of the cylinder and at the same time to eject the butter through the lowest part of the cylinder in exactly controlled quantities and at a pre-determined rate.

Figure 4:
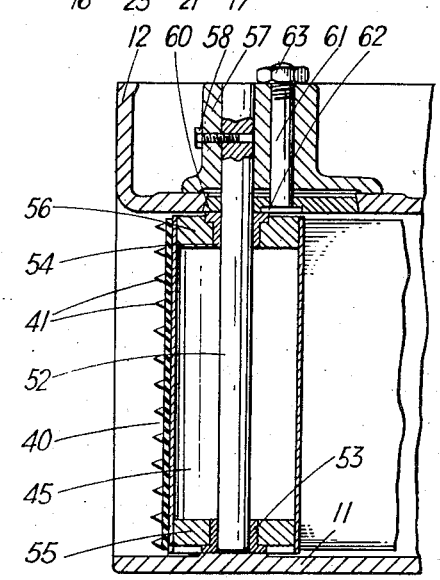
Figure 4 is a section on the line 4—4 on Figure 1.

Beneath the cylinder 35 is a conveyor belt 40 which is made of rubber sheet moulded on one surface with rubber spikes 41. The upper run of this endless belt or conveyor is approximately horizontal and runs at an adjustable distance below the bottom of the cylinder so that slices of bread placed upon the conveyor will be carried under the cylinder and into contact with it and eventually conveyed out on to the other side. The upper run of the conveyor belt is arranged to move in a direction opposite to that of the lower part of the cylinder 35, i. e. so that adjacent parts of the cylinder and belt are moving in opposite directions so as to achieve a spreading effect of the butter on the bread. The conveyor belt preferably moves at a faster speed than the peripheral speed of the cylinder e. g. at 3 to 5 times the peripheral speed of the cylinder. The belt is support on a pair of spaced drums 44, 45. The drum 44 is carried by a spigot 46 located in a bronze bushing 47 in a boss 48 of the plate 12. The drum is thus mounted at one end only so that the end adjacent the plate 11 is in connection with that plate. The spigot 46 has a squared end 49 which removably enters the square hole in a sprocket 50. The chain 51 engages the sprockets 27, 50 whereby the drum 44 is driven at the same time as the roller 34 by operation of the handle 30. The drum 45 is carried by a spindle 52 (see Figure 4). This spindle is located in bushings 53, 54 in blocks 55, 56 fixed within the ends of the drum 45. The spindle also is fixed in a block 57 by a screw 58. The spindle 52 passes through the hole in an eccentric plate 60 this hole being offset from the centre of rotation of the plate which coincides with the axis of a pin 61 on which the plate 60 is mounted this pin being located in a hole in the block 57 and having a head 62 in a recess in the plate 60 and a nut 63 on its other end. The cam plate 60 has its peripheral surface slightly tapered and is set into a recess in the side plate 12 so that its exposed surface is flush with that of the side plate. When the nut 63 is slackened the plate 60 can be rotated by grasping and rotating the block 57 thereby adjusting the drum 45 up or down (see Figure 1) in order to adjust the distance of the upper run of the conveyor belt 40 from the cylinder 35 to accommodate bread of different thicknesses.

The bolt 17 carries a gauge plate 65 along its full length between the plates 11, 12 and this gauge plate serves to control the movement of the slices of bread to hold them evenly as they pass over the cylinder 35. The bolt 16 carries a series of spring blades 66 which are an inch or so wide and serve for further spreading of the butter evenly on the bread.

The machine may be modified in various ways without departing from the scope of the invention. Thus the conveyor belt 40 may be replaced with a table and the roller 24 may carry toothed flanges at its ends for conveying the bread under the cylinder 35. Various scraper blades or wires or doctor blades may be provided and any parts may be heated for example by passing electric current therethrough.

In a further alternative arrangement, the butter container may be constituted by a horizontal partition extending for the full length of the foraminous cylinder and having end closure walls which fit snugly within the curved wall of the cylinder to define a box. One of these end walls is detachable for insertion of a mass of butter thereinto. As the cylinder is rotated, the butter engages the internal surface thereof and is picked up by the perforations. A presser plate may be located behind the mass of butter to force it against the wall of the cylinder at the point where it passes below the horizontal partition. In this arrangement, the gauge plate is mounted externally of the cylinder to extend over a portion of its upper arc above the said partition. The action of this embodiment of the invention is substantially similar to that described above.

In order to prevent waste of butter by operation of the machine when no bread is fed thereto for spreading a manually operated or automatically retractable guard may be located in advance of the pass between the cylinder and the table, and this guard may be mechanically coupled to the bearings for the ejector roller so that when the guard is in position the ejector roller is raised to prevent the pins thereon from entering the perforations in the cylinder. No rotation of the cylinder is possible in these circumstances. When, however, a slice is to be spread the guard is lowered, either manually or by pressure of a slice of bread thereon, and the ejector roller is rendered operative.

In an alternative arrangement, the ejector roller bearings are supported on vertical slides which are connected to a vertically reciprocable table mounted beneath the cylinder and which may be spring-loaded towards the cylinder so as to approach the circumference thereof when no bread is to be spread. This rise of the table thus carries the ejector roller upwards out of engagement with the cylinder so that, even should the cylinder be rotated, no butter picked up thereby will be ejected to waste. When, however, a slice of bread is to be spread, the necessary downward pressure on the table to insert a slice beneath the cylinder causes the ejector roller to drop back into position to effect the necessary ejection action.

Where an automatic waste preventing action such as those described above is provided, the ejector roller spindle may be suitably geared to the cylinder to ensure accurate register of the ejector pins on the roller when the latter is restored to its operative position. For example, a series of pins or teeth may be forced to project axially from the end rim of the cylinder at one end to engage a star wheel secured to the roller and having teeth of sufficient length to remain in mesh with the pins or teeth on the end of the cylinder when the ejector roller is raised. The amount of lift required to render the ejector roller inoperative is, therefore, sufficiently small to prevent jamming of the star wheel against the teeth on the end of the cylinder.

Where relatively large power driven machines are envisaged, the cylinder may be replaced by an endless band of foraminous material which passes over upper and lower rollers, the latter constituting the ejector roller.

In a still further alternative arrangement the foraminous carrier may be arranged in the form of a flat perforated plate which is reciprocable between a butter pick-up position in which it is slidable over the free surface of a mass of butter and a butter spreading position in which it moves beneath a toothed ejector roller, the teeth of which enter the perforations in the manner described above in connection with the foraminous cylindrical carrier. In such an arrangement, the slice of bread to be spread may remain stationary during the spreading operation, or it may traverse in a direction counter to the motion of the plate during the spreading operation.

We claim:

1. A machine for spreading butter and the like spreadable substances on to a base, for example slices of bread, comprising a hollow cylindrical foraminous carrier, means for filling the perforations in the carrier with said substance, a roller located within the carrier and extending substantially completely along the axial length of the carrier, and being of smaller diameter than the carrier, a series of projections carried by the roller and which enter into said perforations for ejecting the substance therefrom on to the surface of the base, a conveyor for the base, and a container for said substance, the carrier being in the form of a cylinder and rotatable one part of which is located adjacent the container for said substance so as to receive said substance into the perforations and another part of which is located adjacent the conveyor for the base, means for rotating the carrier and moving the conveyor so that adjacent parts of the carrier and conveyor move relatively to each other to spread said substance on to the base.

2. A machine for spreading butter and like spreadable substances on to a base, for example slices of bread, comprising a hollow cylindrical formaninous carrier, means for filling the perforations in the carrier with said substance, a roller located within the carrier and extending substantially completely along the axial length of the carrier, and being of smaller diameter than the carrier, a series of projections carried by the roller and which enter into said perforations for ejecting the substance therefrom on to the surface of the base, a conveyor for the base, and a container for said substance, the carrier being in the form of a cylinder and rotatable one part of which is located adjacent the container for said substance so as to receive said substance into the perforations and another part of which is located adjacent the conveyor for the base and a supporting member having an arcuate bearing surface engaging one part of the interior surface of the carrier to support the carrier for rotation on its axis, said roller engaging the carrier at the other part thereof, said carrier being held against the arcuate bearing surface by said roller.

3. A machine as claimed in claim 1 wherein means are provided for gearing the conveyor and cylinder together so that they move at adjacent parts in opposite directions, the conveyor part moving faster than the cylinder part.

4. A machine as claimed in claim 1 wherein the conveyor is a resilient endless belt, and means are provided for driving the belt and cylinder such that the belt moves at 3 to 5 times the speed of the cylinder periphery.

5. A machine as claimed in claim 1 wherein the container is slightly spaced from the cylinder on the approaching part of the cylinder to admit unused substance and the container is close to the cylinder at the exit side to act as a scraper.

6. A machine as claimed in claim 1 wherein the cylinder is supported internally adjacent the container by an arcuate block.

7. A machine as claimed in claim 1 wherein all rotary parts are mounted between side plates one of which carries driving means for the rotary parts, the latter being disengageable by axially sliding movement as soon as the side plates are disengaged from each other.

8. A machine as claimed in claim 1 wherein all rotary parts are mounted between side plates one of which carries driving means for the rotary parts, the latter being disengageable by axially sliding movement as soon as the side plates are disengaged from each other, and wherein the side plate carrying the driving means has bearings supporting one end of each of a pair of drums which carry the conveyor in the form of an endless belt, said drums being unsupported at their other ends.

9. A machine as claimed in claim 1 wherein the conveyor is a resilient endless belt, and means are provided for driving the belt and cylinder such that the belt moves at 3 to 5 times the speed of the cylinder periphery, and wherein the belt is made of rubber and is moulded with spikes or like projections.

10. A machine as claimed in claim 8 wherein all rotary parts are mounted between side plates one of which carries driving means for the rotary parts, the latter being disengageable by axially sliding movement as soon as the side plates are disengaged from each other, and wherein the conveyor is a resilient endless belt, and means are provided for driving the belt and cylinder such that the belt moves at 3 to 5 times the speed of the cylinder periphery, and wherein one drum is carried eccentrically on a rotatably adjustable plate in a recess in the side plate, whereby the distance between the conveyor and the cylinder can be adjusted.

References Cited in the file of this patent

UNITED STATES PATENTS

| | | |
|---|---|---|
| 493,403 | Holmes | Mar. 14, 1893 |
| 813,680 | Vicars | Feb. 27, 1906 |
| 1,574,178 | Sterzing | Feb. 23, 1926 |
| 1,703,144 | Haworth | Feb. 26, 1929 |
| 1,897,207 | MacFarlane | Feb. 14, 1933 |
| 2,169,772 | Schweitzer | Aug. 15, 1939 |
| 2,299,159 | Lyon | Oct. 20, 1942 |
| 2,508,689 | Schick | May 23, 1950 |
| 2,510,658 | Rassman | June 6, 1950 |